(12) United States Patent
Pathak et al.

(10) Patent No.: US 11,972,225 B2
(45) Date of Patent: Apr. 30, 2024

(54) AUTOMATED PATENT LANGUAGE GENERATION

(71) Applicants: Shrey Pathak, London (GB); Xin Gao, London (GB)

(72) Inventors: Shrey Pathak, London (GB); Xin Gao, London (GB)

(*) Notice: Subject to any disclaimer, the term of this patent is extended or adjusted under 35 U.S.C. 154(b) by 627 days.

(21) Appl. No.: 17/061,197

(22) Filed: Oct. 1, 2020

(65) Prior Publication Data

US 2022/0108085 A1    Apr. 7, 2022

(51) Int. Cl.
| | | |
|---|---|---|
| *G06F 16/00* | (2019.01) | |
| *G06F 40/56* | (2020.01) | |
| *G06N 3/045* | (2023.01) | |
| *G06T 7/40* | (2017.01) | |
| *G06V 30/413* | (2022.01) | |

(52) U.S. Cl.
CPC .............. *G06F 40/56* (2020.01); *G06N 3/045* (2023.01); *G06T 7/40* (2013.01); *G06V 30/413* (2022.01); *G06T 2207/30176* (2013.01)

(58) Field of Classification Search
CPC .................................. G06F 16/00; G06K 9/00
See application file for complete search history.

(56) References Cited

U.S. PATENT DOCUMENTS

| | | | | |
|---|---|---|---|---|
| 9,454,731 B1 * | 9/2016 | Lee | .......................... | G06N 3/049 |
| 2006/0190807 A1 * | 8/2006 | Tran | ...................... | G06F 40/166 |
| | | | | 705/310 |
| 2010/0287177 A1 * | 11/2010 | Resnick | .............. | G06F 16/3334 |
| | | | | 707/765 |
| 2013/0198092 A1 * | 8/2013 | Dugan | ................... | G06Q 99/00 |
| | | | | 705/310 |
| 2016/0350886 A1 * | 12/2016 | Jessen | .................. | G06Q 50/184 |
| 2020/0019772 A1 * | 1/2020 | Schuster | .............. | G06V 30/153 |
| 2021/0216584 A1 * | 7/2021 | Devries | ............... | G06F 16/9538 |

FOREIGN PATENT DOCUMENTS

| | | | | | |
|---|---|---|---|---|---|
| CN | 109190112 A | * | 1/2019 | .......... | G06F 40/289 |
| CN | 112015895 A | * | 12/2020 | | |
| CN | 112100398 A | * | 12/2020 | .......... | G06F 16/367 |
| CN | 113196278 A | * | 7/2021 | .......... | G06F 16/322 |

(Continued)

OTHER PUBLICATIONS

Qingzhong Wang and Antoni B Chan. 2018. CNN+ CNN: Convolutional Decoders for Image Captioning.

(Continued)

*Primary Examiner* — Shreyans A Patel
(74) *Attorney, Agent, or Firm* — Xin Gao

(57) ABSTRACT

Methods, systems, and architectures for drafting a patent application are presented. The method comprises acquiring, at least one input, where the input is an image corresponding to a class of patent documents; encoding the image input via at least one first network; generating a set of vectors via the at least one first network, where the set of vectors corresponding to a partial representation of the image, derived from the at least one first network; decoding the set of vectors, based on a predetermined text corpus that corresponds to the class of patent documents, via the at least one second network; and obtaining the claim set via the at least one second network corresponding to the image.

13 Claims, 5 Drawing Sheets

(56) References Cited

FOREIGN PATENT DOCUMENTS

| CN | 111460883 B | * | 5/2022 | ......... G06K 9/00718 |
| EP | 4080380 A1 | * | 10/2022 | ......... G06F 16/3344 |
| WO | WO-2019168189 A1 | * | 9/2019 | ............. G06F 40/20 |
| WO | WO-2020207431 A1 | * | 10/2020 | ........... G06F 16/355 |
| WO | WO-2021106174 A1 | * | 6/2021 | ........... G06N 3/0454 |

OTHER PUBLICATIONS

Marco Pedersoli, Thomas Lucas, Cordelia Schmid, and Jakob Verbeek. 2017. Areas of Attention for Image Captioning. In Proceedings of the IEEE international conference on comput.

* cited by examiner

| FEATURE | STRUCTURE | FUNCTION | OPERATION | METADATA |
|---|---|---|---|---|
| X 1 ••••• •• ••••• • | N connected to J | Current amplifier | When connected in parallel….. | A1B2 |
| X 5 ••••• •• ••••• • | K connected to T | Capacitor amplifier | When connected in circuit….. | A1B10 |

AUTOMATED PATENT LANGUAGE GENERATION

TECHNICAL FIELD

Methods, systems, and architectures for drafting a patent application are presented. The method comprises acquiring, at least one input, where the input is an image corresponding to a class of patent documents; encoding the image input via at least one first network; generating a set of vectors via the at least one first network, where the set of vectors corresponding to a partial representation of the image, derived from the at least one first network; decoding the set of vectors, based on a predetermined text corpus that corresponds to the class of patent documents, via the at least one second network; and obtaining the claim set via the at least one second network corresponding to the image.

BACKGROUND

Although machine learning algorithms have been around for a long time, their industrial application has only begun to pick-up pace. Machine learning has found extensive application in the area of web searches, content filtering on social networks, providing recommendations on e-commerce websites, to name a few. Recent advances have also led to machine learning algorithms being used for identifying, with increased precision, objects in an image, transcribing speech into text, match items based on user interest, etc. In effect, machine learning algorithms power many aspects of modern society.

Specifically, machine learning algorithms work on the basic principle of analyzing past data to develop generalizable rules that are used to predict accurate future results. In other words, the heuristics that an algorithm detects by analyzing past examples could be useful enough in so far as that they are able to produce accurate results in the future, never-seen-before, scenario. Although this powerful, yet general principle has been the driving force of machine learning, it has found limited applicability in the area of law, in particular, the field of intellectual property law. Proponents argue that this is because machine learning algorithms have been unable to replicate human-level higher-order cognition. However, this is far from the truth, in view of recent advances made in the area of machine learning, in particular, the area of deep reinforced learning, and natural language processing (NLP).

When it comes to patent law, machine learning tools have been adopted to some extent. However, this has been limited to lower-level tasks such as machine translation, for example, machine translating a patent, originally drafted in a foreign language, in the reader's language. These tools are currently been employed effectively by various patent offices around the world. However, when it comes to automating the patent drafting process itself, little progress has been made. Although some development has been made in this area, for example, there are automated tools available for drafting the description of a patent document, drafting a set of patent claims in an automated manner is still an untouched area, despite the developments made in the area of NLP.

Patent claims describe the core of an invention and are the subject of disputes in a court of law. Drafting patent claims in an accurate and robust matter remains a significant challenge as there is no standardised practice. Further, the limited context of the textual information provided during drafting varies across the board because patent attorneys, depending on their technology of expertise, try and cover as many aspects as allowable (as independent and dependent claims) hoping to use these as fall back positions in potential litigation. However, there is no reason to suggest that this (or at least part of this) may not be automated. To that end, we present methods and systems to produce an accurate set of claims in an automated manner. This allows the client to save useful dollars and it streamlines the drafting process, hence saving valuable attorney time and significantly improving the overall efficiency.

SUMMARY

According to an aspect of the present invention, there is provided a method for obtaining a claim set of a patent. The method comprises the steps of acquiring, at least one input, wherein the input is an image corresponding to a class of patent documents, encoding the image input via at least one first network, generating a set of vectors, via the at least one first network, corresponding to a partial representation of the image derived from the at least one first network, decoding the set of vectors, based on a predetermined text corpus that corresponds to the class of patent documents, via the at least one second network, and obtaining the claim set via the at least one second network corresponding to the image. This provides for an efficient way to draft a patent document.

According to a further aspect of the present invention, there is provided a computer-implemented method for training at least one network. The method comprises the steps of initializing the at least one network with weights of random value and an adaptive learning rate to an initial value; storing an input layer pattern of images and an output layer patterns of claims; processing the input layer pattern of images in the network to obtain an output pattern of claims; calculating an error between the output layer pattern of images and the output pattern of claims; updating the adaptive learning rate with respect to the calculated error until a final trained state is achieved, otherwise, repeating steps above for as many iterations as necessary to reach the final trained state.

According to a further aspect of the present invention there is provided an architecture of a plurality of networks for processing at least one input, said architecture comprising: at least one first network for encoding input from a text corpus; at least one second network for encoding input from an image; and a third network having an input layer for receiving input the first and second network and an output layer for generating a claim set corresponding to the text corpus and the image.

According to a further aspect of the present invention, there is provided an architecture of a plurality of networks for processing at least one input. The architecture comprises: at least one first network for encoding input from a text corpus; at least one second network for encoding input from an image; and a third network having an input layer for receiving input the first network and an output layer for outputting to at least one fourth network, wherein the at least one fourth network receives input from the first network for generating a claim set corresponding to the text corpus and the image.

According to a further aspect of the present invention, there is provided a system comprising one or more computers and one or more storage devices storing instructions that when executed by the one or more computers cause one or more computers to perform the operations described herein.

According to a preferred aspect of the present invention, the at least one input further comprises a text input that is encoded via the at least one first network and used to generate the set of vectors via the at least one first network.

According to another preferred aspect of the present invention, the second input comprising: at least one feature; and at least one statement relating to the at least one feature.

In another preferred aspect of the present invention, the text input is selectively added to the predetermined text corpus so that the predetermined text corpus is updated based on the class of patent documents.

In another preferred aspect of the present invention, a patent document comprises a published patent application, a granted patent, or a technical document.

In another preferred aspect of the present invention, the granted patent is at least an unexpired patent.

In another preferred aspect of the present invention, the image comprises at least one non-color image.

In another preferred aspect of the present invention, the at least one first network is a convolutional neural network (CNN).

In another preferred aspect of the present invention, the at least one second network is a recurrent neural network (RNN) comprising a Long-Short Term Memory network (LSTM).

In another preferred aspect of the present invention, the obtaining the claim set via the at least one second network corresponding to the text corpus and the image: generating a patent description from the claim set via at least one third network; or generating at least one image from the set of claim features via at least one fourth network.

In another preferred aspect of the present invention, the input layer pattern of images is at least one reference indicator associated with the images and the output layer pattern of claims is the at least one reference indicator associated with the claims.

In another preferred aspect of the present invention, the at least one trained network corresponds to the at least one first network and the at least one second network for the subject-matter described herein.

In another preferred aspect of the present invention, the image input is generated using augmented reality.

In another preferred aspect of the present invention, the text input is derived from an interface, wherein the interface of a document review system.

Other implementation of this and other aspects include corresponding systems, apparatus, and computer programs, configured to perform the actions of the methods, encoded on computer storage devices. A system of one or more computers can be so configured by virtue of software or firmware, hardware, or a combination of them installed on the system that in operation cause the system to perform the actions. One or more computer programs can be so configured by virtue of having instructions that, when executed by the data processing systems cause the systems to perform the actions.

The details of one or more implementations of the subject matter described in this disclosure are set forth in the accompanying drawings and the description below. Other potential features, aspects, and advantages of the subject matter will become apparent from the description, the drawings, and the claims.

BRIEF DESCRIPTION OF THE DRAWINGS

The disclosed technology will be readily understood by the following detailed description in conjunction with the accompanying drawings, wherein like reference numerals designate like structural elements, and in which:

FIG. 4 illustrates an example of a type of data structure; and

DETAILED DESCRIPTION

Figure 1:
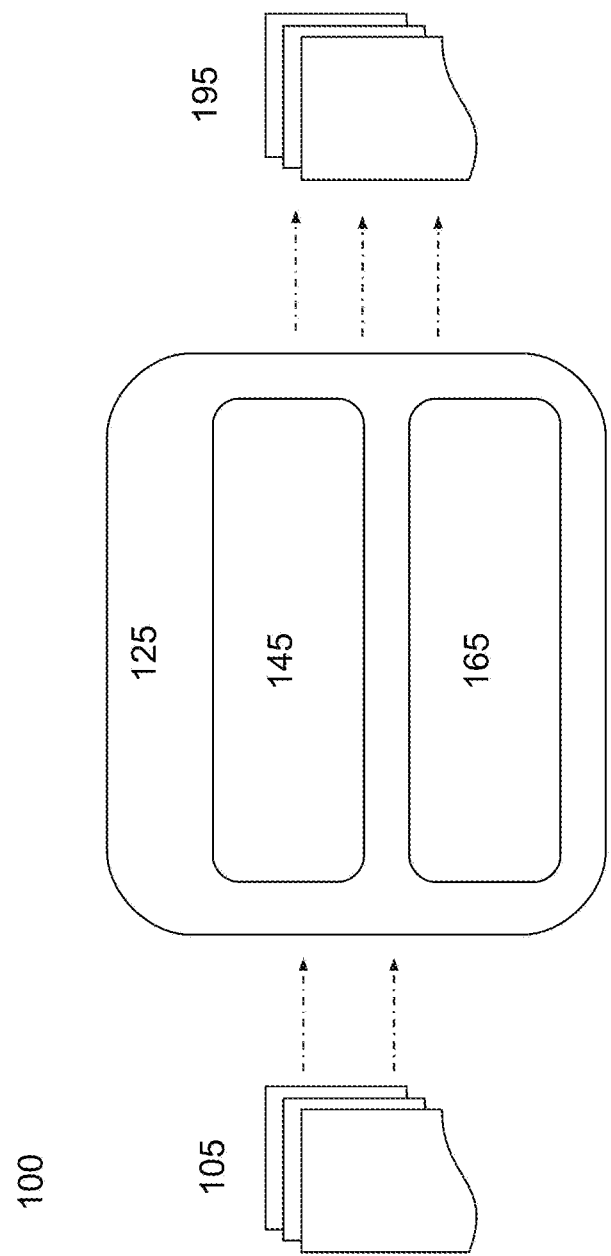
FIG. 1 illustrates an example of a simple block diagram of a system for drafting a patent document.

This disclosure is set forth in the context of the representative aspects of the disclosed embodiments that are not intended to be limiting in any way.

As used in this application, the singular forms "a", "an", and "the" include the plural forms unless the context clearly dictates otherwise. Additionally, the term "include" means "comprises". Further the term "coupled" or "communicatively coupled" encompasses mechanical, electrical, magnetic, optical, as well as practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combination and one another. The disclosed systems, methods, apparatus and computer algorithms, are not limited to any specific aspect or feature or a combination thereof, nor do the disclosed things and methods require that any one or more specific advantages be present or problems are solved. Furthermore, any features or aspects of the disclosed embodiments can be used in various combinations and sub-combination with one another.

Although the operations of some of the disclosed methods are described in particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "train," "sample," "initialise," "embed," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in R, Python, C, C++, Java, or any other suitable programming language. Likewise, the disclosed technology is not limited to any particular computer or type of hardware.

Certain details of suitable computers and hardware are well-known and need not be set forth in detail in this disclosure.

Lastly, any of the software-based aspects of the embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Introduction to the Disclosed Technology

A patent comprises a set of claims, a set of figures and description that describe how to make and use the invention. Each patent is directed to (or classified by) at least one area of technology. Traditionally, specialised personnel, for example, a patent agent (or a patent attorney) drafts the patent application/document, in collaboration with an inventor (or a group of inventors). To accurately cover all feasible aspects of technology, the inventor is required to provide the patent attorney with technical details of the idea. These technical details are then used by the patent attorney to draft the set of claims and figures along with the description.

The technology disclosed in the present application is directed to automating the entire (or at least part) of the above aforesaid procedure. As will be shown, in later sections, this may be achieved by exploiting advances made in the area of NLP, deep convolutional neural networks using images (e.g., image captioning).

More specifically, these technologies employ language corpus and algorithms for processing the language corpus. At the same time, suitable means to improve the accuracy of the automated claim language include the use of an external database of patents (e.g., Google Patents) and deep layered neural networks (e.g., deep convolutional neural networks such as deep CNNs). Similarly, the neural network models herein described are effective for learning to recognize the images/figures of a patent document with a large pool of hierarchical representations. In a specific example below, recurrent neural networks (RNNs) is deployed to transform features derived from the deep CNNs in order to generate a more detailed claim language and associated description.

Beyond image/figure recognition, automatic recognition and localization of a specific set of claims from the description may also be performed. For example, claim language may be derived using datasets where specific technical advantages (or effects) have been mentioned. CNNs and RNNs may be used to annotate images uploaded by a user using a short text describing the context(s) (e.g., technical advantage). Such annotates could be in the form of a note or text corpus, pertaining to an image/figure identifying/indicating the specific novel/inventive part/concept/product. In other examples, a collection of patent images/figures and associated annotations may be stored in an image/figure archive/database. The stored annotations along with images may be extracted based on probability (or confidence interval) of a match with the uploaded image. Further, the stored image may also be updated using the uploaded image. In some other examples, a publicly-available dataset containing patent images/figures and associated descriptions published on the internet as a part of the open-source literature may be used to supplement, or instead of, data stored in a proprietary database.

While one recognises that data bias could create potential problems, it may not be the case when considering how patents are being automated by the present invention. More specifically, the method described herein takes advantage of unique patent-specific concepts directed to an area of technology, novelty, and inventiveness of a certain claim feature pertaining to that area of technology. That is, when drafting "obvious" cases of the technology, taken in abstract, is typically much rarer than "non-obvious" cases, in turn, underlines the basic reason why attorneys would broadly cover as many scenarios as possible. For instance, in the area of biotechnology, one might be using impedance spectroscopy to detect the binding of protein with an antibody. The present invention may consult a variety of databases prior to drafting or using network models.

Nevertheless, to circumvent the possibility of a novel/non-obvious features with a feature that lacks novelty and is obvious, in the abstract, may be underlined by the concept of feature bias; various regularization techniques may be applied to CNN training, such as data dropout and batch normalization to minimize this bias. To train CNNs with image/figure labels/descriptions, or to assign labels/descriptions to the images/figures for this training, pattern mining approaches may be used to assign a label of description to an image/figure or part of the image/figure. Disclosed image/figure caption generation methods may be applied to annotate the rest of the content of a selected or uploaded image/figure, for example, such a novel/non-obvious feature location. This may also be conducted using other networks such as RNNs, where any possible additional technical effects/advantages may be described in contexts of the novel/non-obvious feature in combination with the other features of the invention, based on the CNN image encodings.

In some examples, CNN models may be trained with one feature label per image/figure inferred from an image annotation(s), for example, "portable blender" or "meshed chair". However, such feature labels do not fully account for the context of a patent (or even a patent claim). For instance, "portable blender with replaceable battery pack" may be labeled the same as the "portable mixer with replaceable battery pack". To solve this, deep learning algorithms, in combination with NLP techniques, may be used to differentiate between two labels, thereby improving the accuracy of the claim language, and in-turn the robustness of the drafted patent.

In other examples, RNNs may be trained to obtain the context of the features or annotation to be recurrently used to infer the image/figure labels with context (e.g. based on the application and compatibility of the feature with any other feature). The CNNs may be re-trained with the obtained joint image/text contexts and may be used to generate annotations based on the derived CNN features. This may in part be a reinforced learning architecture that uses information gathered from its environment to draft more robust claims or creating labels more efficiently. In turn, the initial CNNs may also be retrained using the newly-assigned labels. This retraining along with image annotation/description will provide a more stable claim. Alternatively, the network models may be scaled to make incremental improvement of an existing patent or first draft of an application in a high-throughput manner.

Detailed Implementation in Relations to the Figures

FIG. 1 illustrates an exemplary environment for the drafting system/environment 100. The system/environment 100 comprises a system 125 which when fed at least one input 105, produces an output 195, for example, a patent document comprising a set of claims, a detailed description of the invention, and associated drawings.

System 125 comprises at least one network 145 that may be communicatively coupled to at least one other network 165. The at least one (other) network 165 may be the same or a different network to the at least one network 145 and at least one network(s) 145 and 165 may be located in close proximity to one another or may remotely communicate with one another using industry-standard communication protocol. Yet, in another aspect, at least one network(s) 145 and 165 may have an architecture similar to that of a (or multiple) neural network(s). In the same aspects, the neural network may be a trained network and/or an untrained network. In an aspect, the at least one network 145 and 165 may have neural network architecture, for example, a convolutional neural network, wherein multiple networks may be combined to receive at least one input. However, the networks may be interchangeably used, and such technical details would be obvious to the person skilled in the art.

For example, when a user uploads a set of images/figures that describe their invention, the illustrated system may perform image classification using a database of patent images/figures. Each image/figure may be associated with text annotations and captions that describe the uploaded/drawn image/figure in addition to identifying/outlining various depicted components, or the lack of depicted components associated with uploaded/drawn image/figure. For example, the image annotations//caption may be encoded based on a standardized collection of terms (e.g., standardised apparatus components link processor, microcontroller, etc.) and formal drafting guidelines (e.g. according to a drafting guidelines published by the WIPO, European Patent Office or Chinese Patent Office or the United States Patent and Trademark Office, to name a few) describing how various components of the images/figures are named, organised and listed. This may not only enable the human reader (for example the inventor or the patent attorney) and the skilled person in the art to accurately infer, from such annotations/description, and understand what/which component(s) are illustrated in the image, but they may also logically understand how they interact with one another, and any technical advantages linked due to the interaction.

There may be instances when the neural network suggests components that may not interact (with one another or with other components of the system) in a consistent manner. In such instances, this output may be presented to the user/inventor and through a series of questions/answers, further clarifications could be made regarding the aforesaid. As such conflicts may be result based on user input, for each image or from an already existing patent document, using a system to summarize it to a collection of standardized terms with pre-defined acceptance. The images may then be used in conjunction with the provided text and retrieved by the CNNs—i.e. the linked description, to draft a set of claims having a scope that may not extend beyond the annotation/description of the image.

It should be noted that a plurality of images/FIGS. 105 and 195 may be received/produced and stored in an image/figure database (not shown). Each of the images/figures includes an associated annotation sequence of a plurality of annotation/description sequences describing each respective image/figure. For example, the annotation/description sequence may include labels indicating system, components, their compatibility with one another, and an indication of the order in which the components are traditionally arranged with one another, and/or a location of the disorder. The words forming the annotation/description sequence may be arranged according to a predetermined order/routine. The annotation/description sequences may be stored in a corresponding image/figure annotation database (not shown). In some examples, the images/FIGS. 105 and 195 and annotation sequences may be stored in the same database.

Figure 2:
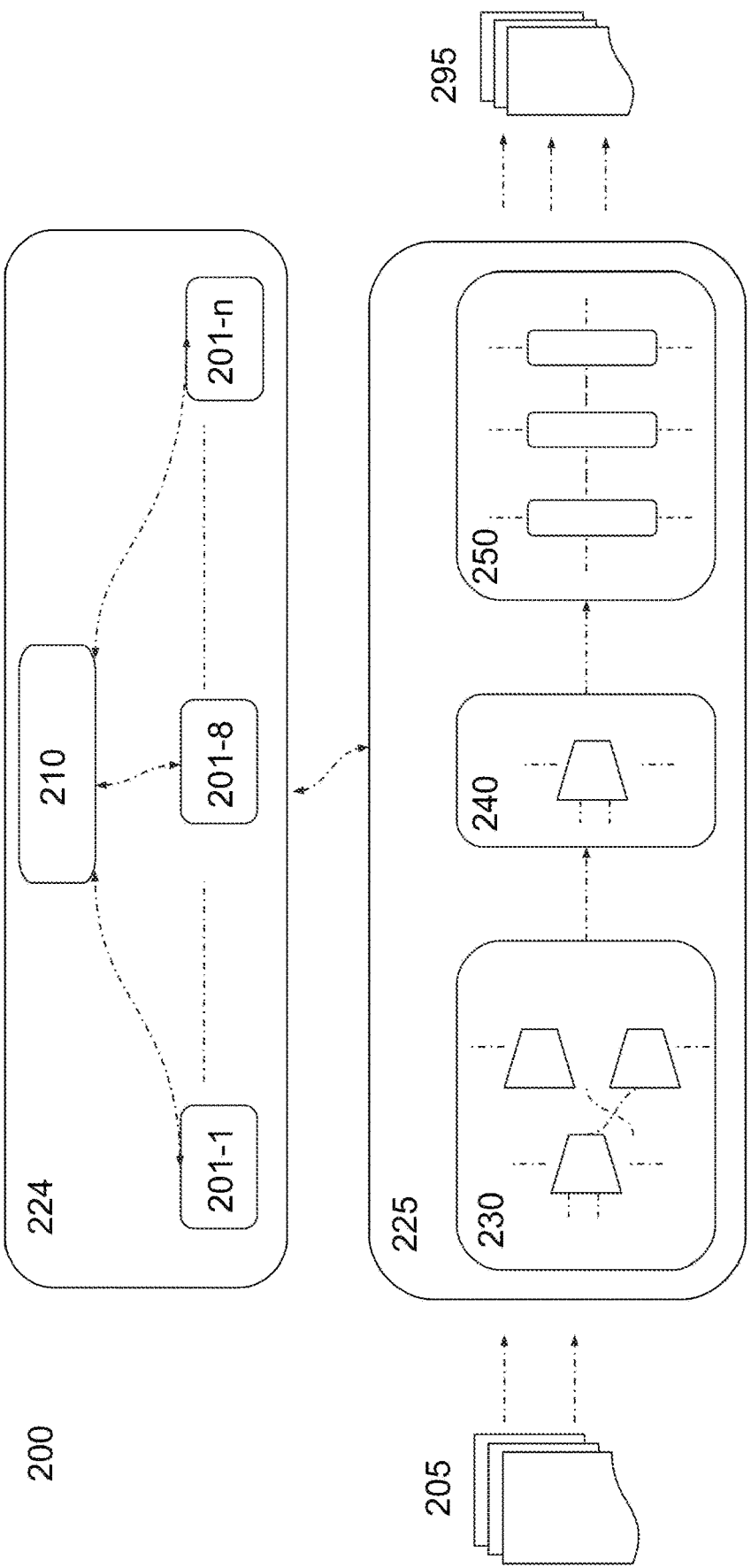
FIG. 2 illustrates an example of a block diagram exemplary constituents of the system.

FIG. 2 illustrates an exemplary architecture of the automated patent drafting system. Briefly, the figure describes an exemplary system for drafting a patent application. The system may be used for deriving a set of claims from a set of annotations/descriptions of a pair of images/figures uploaded by the user. The exemplary system comprises at least one network 224 and 255 that may be a CNN. The at least one network 244, 255 for example, CNN, may be used as the encoder. RNN may be used as a decoder. Other encoder and decoder combinations may be used, such as Long-Short Term Memory (LSTM) or even or gated or transformer-type networks described. Further, in the figure, the text input may be used to direct the network to learn in a reinforced manner, for example, learning the image or alternatively adding semantic relationships to one or more hidden states of the decoder. This is particularly advantageous because it allows the at least one network to converge more robustly.

As shown in FIG. 2, the exemplary system 224 may comprise at least one CNN 201-1 to 201-$n$ that may be trained by applying images/figures of patents from the image/figures database 210. Also, their corresponding image/figure labels/annotations may be extracted from the database 210. Examples of suitable CNNs 201-1 to 201-$n$ may be used to implement the trained neural network include, but are not limited to network-in-network (NIN), AlexNet, GoogLeNet, Google Patents and other architectures that may store patent documents or images/figures (relating to technology). The CNN 201-1 to 201-$n$ may be trained using hundreds, thousands, hundreds of thousands, or more patents or images/figures from patents or case-laws or a combination thereof, depending on the availability of databases with suitable images/figures and annotations/description. In some examples, image/figures and annotation/description may be anonymized prior to training the CNN 201-1 to 201-$n$. Further, it should be stressed that claims, annotation, and descriptions are constructed by considering case-laws (depending on the jurisdiction and technology).

An untrained CNN, for example, CNN 230 (interchangeably used with 201-1 to 201-$n$) may be trained with image inputs, text, and case-laws. Once the example CNN 230 has been trained, an input image/FIG. 205 (e.g., a hand-drawn image), of one or more blenders, including one or more unknown blenders/mixers can be used to predict its corresponding claim language. In particular, the CNN 230 will generate a CNN encoding of the input image CNN 230. The output of the CNN 230 may be directly applied to the RNN 250 or via an intermediate linear layer 240. The RNN may either produce corresponding claim language or return one or more images from the image/figure database 224 and respective associated image annotations/description. In some implementations, the linear layer 240 may be a neural network that is configured to convert the dimensionality of the input. For example, the received input from the CNN 230 may be of a first dimension and the output of the linear layer 240 (which becomes the input of the RNN) may be a matrix in a second dimension (wherein the second dimension may be smaller than the first dimension).

The RNN 250 may be any suitable RNN. This includes long short-term memory (LSTM) and gated recurrent unit (GRU) RNNs, multimodal RNN (M-RNN), and/or RNN that builds on a Log-Bilinear model may be used in certain cases. The RNN 250 may be initialized by embedding the output of the initialized CNN 230 as an updated state vector of the RNN and applying the first word of an annotation sequence, thereby producing a new candidate state vector stored within the RNN. A context vector may be produced by unrolling the RNN with an updated trained CNN embedding a new candidate state vector and a subsequent word of the annotation sequence. For example, an N input word (not shown) may be applied from the input annotation/description sequence, producing N output words and the same number N of state vectors from the RNN 250 may be provided to a mean-pooling circuit (not shown), where N represents the number of unrolling of the RNN network. The mean-pooling circuit averages the state vector values. In other examples, the number of iterations of applying words of an annotation sequence to the RNN 250 may be different. The mean-pooling circuit may, in turn, collect value output from the state vectors from each iteration of the RNN 250. As a result, this may produce an image/figure text context vector, which may encode the existence of plural features (essential and non-essential), their arrangement, locations, and other topologies and context data in a single vector.

This information may then be used to produce a set of claims that are arranged based on the number of essential features along with the associated advantage in conjunction with the text of the invention, described by the user/inventor. This may be accomplished using the reference indicator associated with an image/figure and text provided for by at least one patent document. The reference indicator may be encoded in vector format. In conjunction with using reference indicators, metadata (for example metadata related to a technical and non-technical feature, as shown in FIG. 4) may be used to facilitate the training and drafting. In addition, the NLP language model may be used in combination with the reference indicator during training, these models may include but are not limited to ELMO and BERT. These modules generally utilize one or more neural networks. Similarly, other NLP techniques associated with a more general linguistic approach may be used. The scope of such is beyond this application.

To fine-tune the output claim set, and/or selecting from a database of an image to be feedback to the user. These techniques may be used in conjunction with, before/after the encoding-decoding or in-place of the one or more encoding-decoding networks. These techniques do not substantially deviate from the CNN-RNN architecture but instead utilizes the architecture interchangeably or deterministically. These techniques include but are not limited to Generative Adversarial Networks (GANs) may be used in an unsupervised, and reinforcement learning in a supervised or semi-supervised manner.

The image/figure text context vector may thus be used to provide generated annotations/description that not only provide the essential (and non-essential) features of the invention but also describe one or more topologies present in the image/FIG. 205 inputted by the user/inventor. Although the inputs described herein are text and image/figure, the system described herein may be capable of drafting a patent application (including a set of claims) from a variety of user inputs, for example, voice command, a gesture control, etc. The input may be acquired from a user or a machine or a combination thereof.

In another aspect, the type of neural network, CNN as illustrated in FIG. 2, may be widely used for feature learning by applying a classifier such as SoftMax that may perform maximum likelihood estimations. Preferably, a Deep CNN, with multiple hidden layers, may be used to extract the image/figure features and pass them onto the decoder RNN with an embedded language model (NLP based NN). Such a network may extract image/figure features and learn a dense feature embedding of each image/figure object and the associated relationships between each object. The learned embedding and relationship or in other words, semantic temporal context of the image, may be passed onto a decoder via a vector. The vector may then process by the decoder RNN in accordance with the embedded language model(s).

In another aspect, an image/text joint context vector (not shown) may be used to label input images, autoencoders (as a second encoder or modification of existing encoder) such as variational autoencoder (VA) and conditional variational autoencoders (CVA) may be used within the network to enhance the result for certain types of images. For a variational autoencoder, the likelihood of data x or p(x) is calculated as compared to a conditional variational autoencoder that calculates the conditional distribution $p(x|c)$, where x is the desired descriptions and c is some representation of the content of the input image. To this end, a more advanced but slower autoencoder such as a gaussian mixture CVA or an additive gaussian CVA may be suitable for certain scenarios. These more probabilistic approaches share a common gaussian component that permits better sampling. While the gaussian mixture CVA switches from one cluster center to another, additive gaussian CVA encourages the embedding z for an image to be close to the average of its objects' means.

Once the "image/text joint context vector" has been produced, various clustering techniques/algorithms (e.g., Regularized Information Maximization, RIM) may be applied, and new labels/annotations may be assigned to the images. The image/text/joint context vector may be applied to retrain the CNN and/or RNN in an iterative process. Only after a satisfactory number of iterations, the neural network training converges and may be used for annotation sequence generation, producing the output words that label/annotate/describe the uploaded image/figure.

It will be obvious to the person skilled in the art that by having the benefit of the present disclosure, in some examples, the RNN 250 may include a single circuit or module implementing the sampling evaluation that may be updated for each applied annotation sequence. In other examples, two or more similar circuits or modules implementing the RNN 250 may be provided in a pipeline, thereby improving the throughput of the evaluated image data and annotated sequence. Nevertheless, the skilled practitioner in the art would also recognise that the RNN architecture used as a decoder may also be deployed for the purposes of encoding the input. In fact, any networks described herein may be used interchangeably and a part of the at least one first, second network, third network, and fourth network.

Also, images/figure inputs may have multiple overlapping revisions of interest, to obtain better results, applying the above techniques to an inference mechanism may be applicable. In which case, the inference mechanism should jointly depend on the image features of the region and the predicted claim language associated with that region; in turn, the inference mechanism allows identification of an appropriate position of the bounding box. When this happens, it may be preferable to use a context fusion that can combine claim features with the image features of respective regions to provide a rich semantic description that would further enhance the results.

Figure 3:
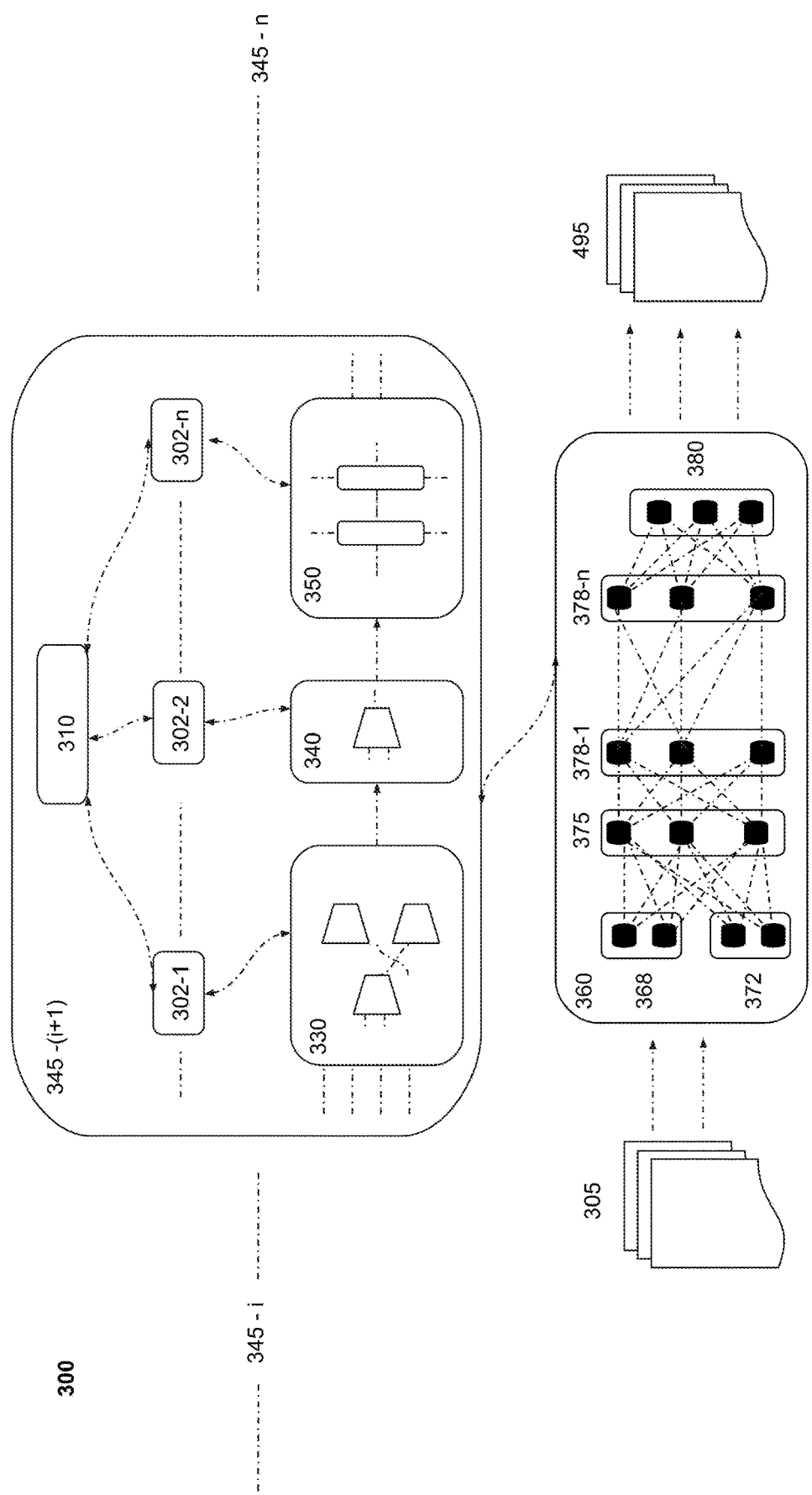
FIG. 3 illustrates an example of a block diagram of the at least one first network and at least one second network with at least one connected and hidden layers.

As shown in FIGS. 2 and 3, the user/inventor uploads an image/figure set and/or upload a text 205/305, for example, a statement identifying the image. Alternatively, the user may provide a brief description of the invention. Optionally, the user may also select CPC (or a classification fulfilling a similar requirement) thereby indicating the subject to which the invention relates. Additional CPC classifications may also be selected by the user to further define the subject to which the invention relates. Here, the system may also recommend to the user a CPC classification based on a specified class/technology.

For example, the user uploads a series of five images of various parts of a kitchen blender, for example, the final image of a kitchen blender may show. In the statement section, the is capable of housing a replaceable battery pack. Additionally, the user may write a short description of the invention. For example, the user writes a few statements describing the invention—"I have invented a new kitchen blender which is ideal for travellers. My new kitchen blender has two features have made it suitable for travellers, first being that the blender has an internal locking mechanism. Second, the novel blender runs on A3 and A4 batteries and has a charging point. These features allow the blender to be used while travelling".

In addition, the user may also select a Cooperative Patent Classification (CPC) as it denotes the subject to which the invention relates. As the CPC classification is divided into nine sections, A-H and Y, which in turn are sub-divided into classes, sub-classes, groups, and sub-groups that the user may select in an iterative until there is nothing more to select. For example, as the user's invention relates to blenders, they may end-up with the CPC number as "A47J43/046: which, according to the CPC classification, relates to "Machines for domestic use not covered elsewhere, e.g. for grinding, mixing, stirring, kneading, emulsifying, whipping or beating foodstuffs, e.g. power-driven with tools driven from the bottom side". The claimed subject-matter of this patent is not limited to the accurate selection of the CPC.

Based on the received image, the system may use a type of neural network to match each uploaded image/figure to an image and associated annotation/description stored in the database. The degree to which an uploaded image/figure matches an image/figure stored in a database may be determined using a similarity score or a confidence interval. For example, if the similarity score of 1 (maximum score) denotes a perfect match while a similarity score of 0.5 denotes (only 50% of features have been matched). In another example, additional indicators (such as a confidence interval) may be used to denote the matching profile.

In another example, and depending on the degree of match, the neural network may proceed to retrieve a set of indicators (for example labels) that illustrate the matched features. For example, indicator labels such as blender handle, blender sidewall, etc. may be retrieved from the matched image (present in the database). In this manner, each image provided by the user is not only labelled/annotated and a feature list (or a set) may be created concurrently.

In another example, image input is generated using augmented reality (AR). AR improves the understanding of the real-world object by detecting feature points and planes via techniques such as light estimation of the object's environment. In turn, AR uses image processing from a given image to offer you with average intensity and color correction. The detailed implementation of AR specific input is beyond the scope of this application.

In another example, the text input is derived from an interface, where the interface of a document review system. For example, the document review system a system for prosecuting a patent application, i.e. an interface to view and provide a template for an attorney to respond to office communication.

Herein described, is an example of a convolutional neural network (CNN), that may be used in certain examples of the disclosed technology. In some examples, the illustrated neural network may be implemented using one or more general-purpose microprocessors. In other examples, the illustrated neural network may be implemented using acceleration provided by graphics processing units (GPU), field-programmable gate arrays (FPGA), or other suitable acceleration technology. The illustrated neural network may be deemed a network-in-network (NIN) topology. In other examples of the disclosed technology, other neural network architectures can be employed, including AlexNet, GoogLeNet, GooglePatents or other suitable architectures.

Also shown in FIGS. 2 and 3, an input image/FIG. 205, 305, selected according to the disclosed technologies is input to the NN neural network 230, 240, 330, 340 may include a number of multilayer perceptron (MLP) convolutional layers and a global average pooling layer or fully connected layer (not shown). The use of multilayer perceptrons is compatible with the structure of convolutional neural networks and can be trained using back-propagation.

A rectified linear unit may also be used as the activation function in the multilayer perceptron. From a cross-channel pooling point of view, this calculation may equivalent to a cascaded cross-channel parametric pooling on a normal convolution layer. Each pooling layer may perform weighted linear recombination on the input feature maps, which may then go through a rectifier linear unit. The cross-channel pooled feature may map cross channels pooled repeatedly in the next layers. Such cascaded cross-channel parametric pooling structures may allow for complex and learnable interactions of cross channel information.

Alternatively, an attention-based technique may employ the position of CNN activation grid or object proposal method while another may be an end to end trainable convolutional spatial transformer along with CNN activation gird and/or an object proposal network. In the context herein, the attention looks at an image input and decides at each time step, during encoding, regions of the image input that may be important. This also applies when the text corpus is encoded. When reading the text corpus, the network will focus on a segmentation of the text but at the same time, either the same network or a different network holds the important keywords of the text to provide context for decoding. In essence, the encoder theoretically writes down key text or image regions that are important to the semantics of the claim language. In the context of a CNN, for each input that the CNN reads, the attention considers several other inputs at the same time and decides which ones are important by attributing different weights to those inputs. The Decoder will then take as input the encoding and continues to update weights accordingly attuned to the "attention."

Related to attention is the transformers. In a transformer, attention modules are stacked on top of each other together with the feed-forward layers. The input images and output claim language are first embedded into an n-dimensional space without retaining strings directly. The position or the relative of the inputs are encoded and added to the embedded representation of the n-dimensional vector. In the context of network models herein, attention and more specifically transformer-based architecture may be utilized.

In one exemplary implementation, the network comprises at least one CNN and at least one RNN. In abstract, on one side the CNN is mapped image pixel to a 1 to n vector and in another, the RNN maps the 1 to n vector to claim language embeddings. The model is trained on 1000 images and 1000 corresponding claims directed to each of the images (800 images for training, 100 for validation and 100 for testing) In this example, also described above, the image is segmented. Bounded box technique is used, where CNN takes the image inside a given bounding box and returns the 4096-dimensional activations of the fully connected layer before the classifier. Weights of the CNN is initialised with the parameters in the CNN classifier layer. CNN architecture can be any of the above described, with approximately 80-100 million parameters. In terms of the objective function, similarity scores for image-claim pair will be computed as a fixed function of their pairwise fragment scores. This is, the number of matches is positively correlated with the similarity score. Hence, the objective function is the weighted sum of the similarity score and the regularization (L2) term. Finally, stochastic Gradient Descent (SGD) with mini batches of 100-300, the momentum of 0.8-0.9 and make 15-20 epochs through the training data. The learning rate is cross-validated and annealed by a fraction of ×0.1 for the final two epochs.

As shown in FIGS. 2 and 3, an exemplary RNN 250/350 may be a long short-term memory (LTSM). Basically, the LSTM maintains a memory that is updated/changed over time. The output, or activation of the LSTM, may be computed as a function of the stored memory values. For example, each output element can be computed by applying an output gate that modulates the amount that the memory content is exposed to the output. An intermediate function, for example, a sigmoid or hyperbolic tangent, may be applied to values stored in the corresponding memory cell. The memory cell may then be updated at a next-time unit by partially forgetting the existing memory value and adding new memory content through the input.

To handle a large amount of image data, while providing long term memory, LSTM networks may be used. Variation of LSTM may include, the structure-content neural language model (SC-NLM), which retains the capability to extricate the structure of the sentence in addition to its content via the encoder; guided LSTM better (gLSTM), where gLSTM that can generate long sentences by adding global semantic information to each gate and cell state of LSTM while considering length of normalization strategies to control clause length of a claim; and deep bidirectional LSTM-based, where past and future context of the text is utilized in the prediction of the claim language. In conjunction with LSTM, other attention-based techniques/models (attention mapping) may also be used. During attention, more specifically, for stochastic hard attention and deterministic soft attention, where salient regions of the given image are focused in each time step of the language generation model based on generated words or phrases (applying F-CNN), the output text may also be updated dynamically until the end state. Hence, the overall accuracy of certain recognized image objects would be improved.

Further improvements to the attention-based LSTM networks may include techniques that decompose the ground truth language derived from the image input 205/305 into two parts: skeleton sentence and attribute phrases, in turn, creating a template. One example of this architecture is applying a ResNet and two LSTM with one tuned to attention and another a skeleton.

Alternatively, LSTM gated networks/gated recurrent units may be used. The basic idea of these types of networks is that certain gates modulate information received at the decoder. One gated approach is Gated Recurrent Unit (GRU), which separate memory cells and uses fewer gates to control the flow of information. Gated networks may significantly improve the training speed. The GRUs allows each recurrent unit of the RNN to adaptively capture dependencies of different time scales. The GRU is similar to the LSTM unit in that there are gating units (e.g., they possess a reset gate, and an update gate, used to modulate the flow of information inside the unit. However, the GRU differs from the LSTM in that it does not have separate memory cells besides the current state and the candidate state. Any form of suitable memory (e.g., latches, flip-flops, registers, addressable memories implemented with dynamic RAM (included embedded DRAM), static RAM, memristors) may be used to store data for the current and candidate state general-purpose processor, a co-processor (e.g., a GPU or neural network chip), an FPGA, or a system-on-chip (SoC) including such memory or coupled to such a memory can be adapted to provide the illustrated GRU RNN. Both LSTM and GRU implementations address the vanishing gradient problem exhibited in certain RNNs.

As shown in FIG. 3, typically during reinforcement learning, an agent 360 may be tasked to discover data and/or labels by exploring the learning environment 345-(i+1) and a reward 372. As shown in FIG. 3, the agent 360 interacts with the environment and obtains a set of output 380 via a number of visible 375 and hidden 378-1 layers. The output may be post-processed, for example, checked to see that correct policy has been applied, to create a patent document.

In one example, the input layer 368 and 372, the hidden layers 375, 378-(1–n), and the output layer 380 may be part of a deep neural network.

In another example, an actor-critic-based reinforcement learning environment may be used. In this example, the critic is used to estimate the expected future reward to train the actor. More specially, a reinforcement learning agent chooses an action, receives reward values, and moves to a new state. The agent may attempt to select the action with the expectation of having a maximum long-term reward, possibly with Monte Carlo rollouts. A different example of reinforcement learning is a policy gradient method, where specific policy for a specific action may be applied using gradient descent and other gradient optimization techniques. The policy can incorporate domain knowledge for the action that guarantees convergence.

In the context of the present application, instead of starting with the knowledge of the ground-truth labels that the neural network may try to predict, for example, the objects of the image input, the goal of reinforced learning is to create a model that maps different images objects to their respective relationships. To achieve this goal, reinforcement learning models may rely on the current state of how the image objects are arranged and based on the arrangement/relationship, a scalar value is attached to each relationship. The rewards returned by the current state may vary, may be delayed, or may also be affected by unknown variables, for example, by introducing noise in the feedback loop. In essence, using feedback from the current state, the network can use the difference between its expected reward and the ground-truth reward to adjust its weights and improve its interpretation of state-action pairs or the image objects and their respective relationships.

Alternatively, the output may be fine-tuned by vetting using semantic relationship indicators at the hidden states of the decoder. This allows the decoder to produce robust claims, embedded with the semantic relationships. For example, a dependency tree may be used to train and map sentence segments with the image regions that may have a fixed window context.

The mapping of the sentence segments from a text input with the image regions from an image input may permit the incorporation of text input into the CNN encoded image layers prior to generating the vector. A similar approach may be applied during decoding or otherwise.

Figure 5:
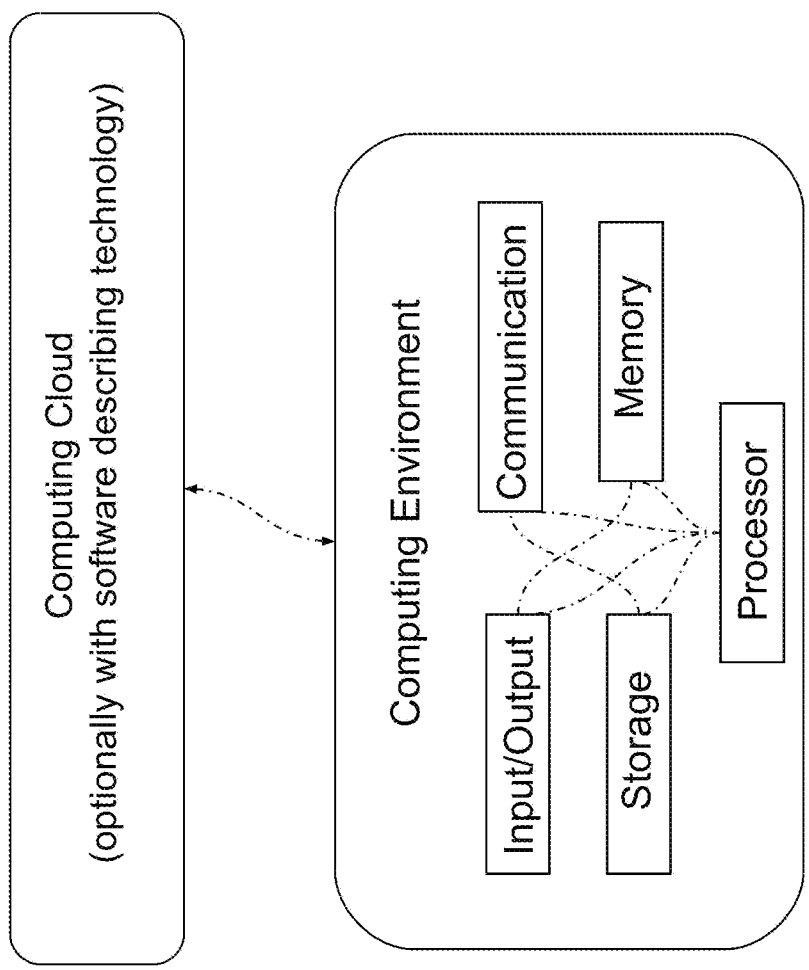
FIG. 5 illustrates an example of a computing environment.

FIG. 5 shows an exemplary computing environment that is not intended to suggest any limitation as to the scope of use or functionality of the technology, as the technology may be implemented in diverse general-purpose or special-purpose computing environments. For example, the disclosed technology may be implemented with other computer system configurations, including hand-held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

As shown in FIG. 5, the exemplary computing environment includes at least one processing unit and memory. In FIG. 5, this most basic configuration is included within a dashed line. The processing unit executes computer-executable instructions and may be a real or a virtual processor. In a multi-processing system, multiple processing units execute computer-executable instructions to increase processing power and as such, multiple processors can be running simultaneously. The memory may be volatile memory (e.g., registers, cache, RAM), non-volatile memory (e.g., ROM, EEPROM, flash memory, etc.), or some combination of the two. The memory stores software, images, and video that can, for example, implement the technologies described herein. A computing environment may have additional features. For example, one or more co-processing units or accelerators, including graphics processing units (GPUs), can be used to accelerate certain functions, including the implementation of CNNs and RNNs. The computing environment may also include storage, one or more input device(s), one or more output device(s), and one or more communication connection(s). An interconnection mechanism (not shown) such as a bus, a controller, or a network, interconnects the components of the computing environment. Typically, operating system software (not shown) provides an operating environment for other software executing in the computing environment and coordinates the activities of the components of the computing environment.

The storage may be removable or non-removable and includes magnetic disks, magnetic tapes or cassettes, CD-ROMs, CD-RWs, DVDs, or any other medium which can be used to store information and that can be accessed within the computing environment. The storage stores instructions for the software, image data, and annotation data, which can be used to implement technologies described herein.

The input device(s) may be a touch input device, such as a keyboard, keypad, mouse, touch screen display, pen, or trackball, a voice input device, a scanning device, or another device that provides input to the computing environment. For audio, the input device(s) may be a sound card or similar device that accepts audio input in analog or digital form, or a CD-ROM reader that provides audio samples to the computing environment. The output device(s) may be a display, printer, speaker, CD-writer, or another device that provides output from the computing environment.

The communication connection(s) enable communication over a communication medium (e.g., a connecting network) to another computing entity. The communication medium conveys information such as computer-executable instructions, compressed graphics information, video, or other data in a modulated data signal. The communication connection(s) are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some aspects of the disclosed methods can be performed using computer-executable instructions implementing all or a portion of the disclosed technology in a computing cloud. For example, disclosed compilers and/or processor servers are located in the computing environment, or the disclosed compilers can be executed on servers located in the computing cloud. In some examples, the disclosed compilers execute traditional central processing units (e.g., RISC or CISC processors).

Computer-readable media are any available media that can be accessed within a computing environment. By way of example, and not limitation, with the computing environment, computer-readable media include memory and/or storage. As should be readily understood, the term computer-readable storage media includes the media for data storage such as memory and storage and transmission media such as modulated data signals.

Aspects of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. aspects of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other units suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smartphones, or other stationary or portable devices, that includes one or more processors and computer-readable media. Additionally, two or more of the engines may be implemented on the same computing device, or on different computing devices.

The processes and logic flow described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field-programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; general-type disks; and CD ROM and DVD-ROM disks. The processor and the memory can be supplemented by, or incorporated in, special purpose logic circuitry.

To provide for interaction with a user, aspects of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, the feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular aspects of particular inventions. Certain features that are described in this specification in the context of separate aspects can also be implemented in combination in a single aspect. Conversely, various features that are described in the context of a single aspect can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the aspects described above should not be understood as requiring such separation in all aspects, and it should be understood that the described program components and systems can generally be integrated together in a single software product or packaged into multiple software products.

Furthermore, the training or evaluation using neural networks as described herein are performed ideally using graphics processing units (GPUs) or field-programmable gate arrays (FPGAs). Of these GPUs are within the context of the computer or computers described in the above paragraphs. These GPUs can be hosted by a deep learning cloud platform such as Google Cloud Platform™. Examples of GPUs include but are not limited to Google's Tensor Processing Unit (TPU)™, NVIDIA DGX-1™ or Volta™, Microsoft' Stratix V FPGA™, Graphcore's Intelligent Processor Unit (IPU)™, Qualcomm's Zeroth Platform™ with Snapdragon Processors™—Intel's Nirvana™, Movidius VPU™, Fujitsu DPI™, ARM's DynamiclQrm, IBM TrueNorth™. Preferably, GPUs will be used in combination of CPUs both for processing the networks as well as communicating with a number of peripheral devices via bus subsystem. These peripheral devices can include a storage subsystem including, for example, memory devices and a file storage subsystem, user interface input devices, user interface output devices, and a network interface subsystem.

Particular aspects of the subject matter have been described. Other aspects are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Certain other or additional aspects of the present invention are as follows:

In an aspect of the present invention, there is provided a method for obtaining a set of claim features, the method comprising: acquiring, at least one input, wherein the input comprises at least a text corpus and an image; encoding the image input via a first network, wherein the first network comprises at least one architecture of a deep neural network, such as a convolutional neural network; encoding the text corpus input via a second network, wherein the second network, like the first network, comprises at least one architecture of the deep neural network, such as a recurrent neural network; decoding a set of features based on the encoded image input and the encoded text corpus input; and retrieving a set of claim features, based on the decoded set of features.

In a further aspect of the present invention, there is also provided a method for obtaining a set of claim features wherein the step of deriving the set of features based on the encoded image input and the encoded text corpus input is carried out by a third network.

In a further aspect of the present invention, there is also provided a method for obtaining a set of claim features wherein the set of features comprises a set of reference indicators, wherein the first set of reference indicators represents the encoded image and the second set of reference indicator represents the encoded text corpus.

In a further aspect of the present invention, there is also provided a method for obtaining a set of claim features wherein the text corpus input comprises a user specified text corpus and/or a training text corpus.

In a further aspect of the present invention, there is also provided a method for obtaining a set of claim features wherein the training text corpus is updated based on the user specified text corpus and/or the derived set of features.

In a further aspect of the present invention, there is also provided a method for obtaining a set of claim features wherein the step of retrieving the set of claim features, based on the derived set of features, to draft a patent application comprises: retrieving at least one features from a categorically arranged feature set, based on at least one classification, wherein the categorically arranged feature is derived from a patent document.

In a further aspect of the present invention, there is also provided a method for obtaining a set of claim features wherein the categorically arranged features comprises: at least one technical feature; at least one non-technical feature; and/or at least one statement relating to the at least one technical feature.

In a further aspect of the present invention, there is also provided a method for obtaining a set of claim features wherein the patent document comprises a published patent application, a granted patent, or a technical document.

In a further aspect of the present invention, there is also provided a method for obtaining a set of claim features wherein the granted patent is at least an expired patent document or patent document that is within its statutory term, wherein the statutory term is normal or extended.

In a further aspect of the present invention, there is also provided a method for obtaining a set of claim features wherein the third network comprises a combination of the first network and the second network.

In a further aspect of the present invention, there is also provided a method for obtaining a set of claim features wherein the first network and/or the second network further comprises at least one autoencoder, such as a sparse autoencoder, denoising autoencoder, contractive autoencoder, and variational autoencoder.

In another aspect of the present invention there is provided a method for obtaining a set of claim features for drafting a patent application, the method comprising: acquiring, at least one input, wherein the input comprises at least a text corpus and an image; encoding the image input via a first network, wherein the first network comprises at least one class of a deep neural network, such as a convolutional neural network; encoding the text corpus input via a second network, wherein the second network, like the first network, comprises at least one class of a class of the deep neural network, such as a recurrent neural network; decoding a set of features based on the encoded image input and the encoded text corpus input; retrieving a set of claim features, based on the derived set of features; and drafting a patent application based on the retrieved set of claim features.

In a further aspect of the present invention there is provided a method for obtaining a set of claim features for drafting a patent application, wherein the classification comprises a Cooperative Patent Classification (CPC), United States Patent Classifications (USPC), European Classification (ECLA), International Patent Classification (IPC), and Japanese Classification Systems (F-Term and F-Index).

In another aspect of the present invention, there is provided a method for obtaining a set of features used to draft patent application, the method comprising: acquiring, at least one input, wherein the input comprises at least a text corpus, and an image; determining, based on the image input, a first set of reference indicators; computing a relationship between the first set of reference indicators and the text corpus; and obtaining, based on the computed relationship, the set of features used to draft a patent application.

In a further aspect of the present invention, there is provided a method for obtaining a set of features used to draft patent application, wherein the determining, based on the image input, the first set of reference indicators further comprises: determining at least one reference indicator that corresponds to a characteristic and/or a sub-characteristic of the image; and creating, based on the determined at least one reference indicator, a first set of referent indicators.

In a further aspect of the present invention, there is provided a method for obtaining a set of features used to draft patent application, wherein the associating the first set of reference indicator to a predetermined text corpus further comprises: determining a probability of the at least one feature from the predetermined text corpus given the first set of reference indicators.

In a further aspect of the present invention, there is provided a method for obtaining a set of features used to draft patent application, wherein the text corpus is added into the predetermined text corpus and the predetermined text corpus is updated.

In a further aspect of the present invention, there is provided a method for obtaining a set of features used to draft patent application, the method further comprising segmenting the text corpus input according to a template, wherein the template is derived from a second set of reference indicators.

In a further aspect of the present invention, there is provided a method for obtaining a set of features used to draft patent application, wherein the segmenting, the text corpus input according to the template, wherein the template is derived from the second set of reference indicators further comprises: determining at least one reference indicator of the second set of reference indicators that correspond to at least one feature of a patent document; deriving the template based on the at least one reference indicator of the second set of reference indicators; and classifying, the text corpus in accordance with the template.

In a further aspect of the present invention, there is provided a method for obtaining a set of features used to draft patent application, wherein the obtaining, based on the computed relationship, the set of claim features corresponding to the text corpus and the image further comprising: generating a set of claims from the set of claim features based on the computed relationship; or generating at least one image from the set of claim features based on the computed relationship.

In a further aspect of the present invention, there is provided a method for obtaining a set of features used to draft patent application, further comprising updating the relationship between the first set of reference indicators and the text corpus based on the second set of reference indicators further comprises: determining a compatibility score between the at least one feature from the first set of reference indicator and the at least one feature from the second set of reference indicators; and computing the relationship between the first set of reference indicators and the second set of reference indicators based on the compatibility score.

In a further aspect of the present invention, there is provided a method for obtaining a set of features used to draft patent application, wherein the determining a compatibility score between the at least one feature from the first set of reference indicator and the at least one feature from the second set of reference indicators further comprises: computing a probability of the at least one feature from the first set of reference indicators given the at least one feature from the second set of reference indicators.

In a further aspect of the present invention, there is provided a method for obtaining a set of features used to draft patent application, wherein the determining a compatibility score between the at least one feature from the first set of reference indicator and the at least one feature from the second set of reference indicators further comprises: assessing similarity between the at least one feature from the first set of reference indicator and at least one feature from the second set of reference indicator; and determining the compatibility score based on the assessed similarity.

In a further aspect of the present invention, there is provided a method for obtaining a set of features used to draft patent application, wherein the determining, based on the image, the first set of reference indicators further comprises: determining at least one reference indicator of the first set of reference indicators that corresponds to a characteristic and/or a sub-characteristic of the image; and associating the determined at least one reference indicator with at least one feature of a patent document.

In a further aspect of the present invention, there is provided a method for obtaining a set of features used to draft patent application, wherein the segmenting, the text corpus input according to the template, wherein the template is derived from the second set of reference indicators further comprises: determining at least one reference indicator of the second set of reference indicators that correspond to at least one feature of the patent document; deriving the template based on the at least one reference indicator of the second set of reference indicators; and classifying, the text corpus in accordance with the template.

In a further aspect of the present invention, there is provided a method for obtaining a set of features used to draft patent application, wherein the patent document comprises a published patent application, a granted patent, or a technical document.

In a further aspect of the present invention, there is provided a method for obtaining a set of features used to draft patent application, wherein the granted patent is at least an expired patent document or patent document that is within its statutory term, wherein the statutory term is normal or extended.

In a further aspect of the present invention, there is provided a method for obtaining a set of features used to draft patent application, wherein the text corpus further comprises at least one technical feature; at least one non-technical feature; and at least one statement relating to the at least one technical feature.

In a further aspect of the present invention, there is provided a method for obtaining a set of features used to draft patent application, wherein the computing a relationship between the first set of reference indicators and the second set of reference indicators further comprises: determining a compatibility score between the at least one feature from the first set of reference indicator and the at least one feature from the second set of reference indicators; and computing the relationship between the first set of reference indicators and the second set of reference indicators based on the compatibility score.

In a further aspect of the present invention, there is provided a method for obtaining a set of features used to draft patent application, wherein the determining a compatibility score between the at least one feature from the first set of reference indicator and the at least one feature from the second set of reference indicators further comprises: computing a probability of the at least one feature from the first set of reference indicators, given the at least one feature from the second set of reference indicators.

In a further aspect of the present invention, there is provided a method for obtaining a set of features used to draft patent application, wherein the determining a compatibility score between the at least one feature from the first set of reference indicator and the at least one feature from the second set of reference indicators further comprises: assessing similarity between the at least one feature from the first set of reference indicator and at least one feature from the second set of reference indicator; and determining the compatibility score based on the assessed similarity.

In a further aspect of the present invention, there is provided a method for obtaining a set of features used to draft patent application, wherein the segmenting, the text corpus input according to a template, wherein the template is derived from a second set of reference indicator further comprises: extracting a first vector, wherein the first vector represents a semantic association between at least one feature of the text corpus; extracting a second vector, wherein the second vector represents a transitive relationship between the at least features of the text corpus; compiling a matrix using the extracted first and second vectors and creating a template based on the extracted matrix.

According to an aspect of the present invention, there is provided a method for obtaining a set of claim features is provided. The method comprises acquiring at least one input, wherein the input comprises a text corpus and an image; determining, based on the image input, a first set of reference indicators; computing a relationship between the first set of reference indicators and the text corpus; and obtaining, based on the computed relationship, the set of claim features corresponding to the text corpus and the image. This allows a more comprehensive coverage of the claim space by applying an image-directed approach. More specifically, the image-directed approach utilizes the reference indicator to provide bilateral mapping of the input/output as to permit the effective origination of more accurate claim features.

In another aspect of the present invention, the text corpus comprises a user text corpus and a training text corpus. Here, the user text corpus may correspond to the training text corpus in a manner such that the user text corpus that corresponds to the training text corpus always comes after the training text corpus, for a given time period. This allows for continuous training in a sequential fashion while using the text corpus. More specifically, the accuracy of claim features as being generated should improve with the updating text corpus. Preferably, at least one user text corpus may sequentially follow the corresponding text corpus as an input.

In a further aspect of the present invention, the step of determining, based on the input image, a first set of reference indicators are provided. The steps may comprise determining at least one reference indicator of the first set of reference indicators that corresponds to a characteristic and/or a sub-characteristic of the image; and associating the first set of reference indicator to a predetermined text corpus. This allows a robust search of the image space and mapping such as the claim space. More specifically, the mapping enhances the efficiency by employing In a preferred aspect of the present invention, the set of reference indicators may be vectors with variable dimensionality.

In another preferred aspect of the present invention, when text corpus is the training corpus, the predetermined text corpus may be empty or may contain a null value. Yet further, when the text corpus is user text corpus, the predetermined text corpus may the training text corpus that corresponds to the user text corpus.

In a preferred aspect of the present invention, the text corpus may be a second training text corpus, wherein the second training text corpus data may partially overlap with the first training corpus data and/or the user text corpus data.

In another aspect of the present invention, wherein associating the first set of reference indicator to a predetermined text corpus further comprises: determining a probability of the at least one feature from the predetermined text corpus given the first set of reference indicators.

In another aspect of the present invention, the text corpus may be added into the predetermined text corpus and the predetermined text corpus may be updated.

In a preferred aspect of the present invention, the text corpus and the predetermined text corpus may be updated depending on the similarity between the text corpus and the predetermined text corpus.

In another aspect of the present invention, there is provided a method for obtaining a set of claim features. The method comprises the steps of: acquiring at least one input, wherein the input comprises a text corpus and an image; segmenting the text corpus input according to a template, wherein the template is derived from a second set of reference indicators; determining, based on the image input, a first set of reference indicators; computing a relationship between the first set of reference indicators and the text corpus; and obtaining, based on the computed relationship, the set of claim features corresponding to the text corpus and the image. This provides the advantage of more accurate results while reducing the computational cost as such. More specifically, the second set of reference indicator permits quicker convergence.

In another aspect of the present invention, there is provided a method for segmenting the text corpus input according to the template. The method comprises the steps of: determining at least one reference indicator of the second set of reference indicators that correspond to at least one feature of the patent document; deriving the template based on the at least one reference indicator of the second indicators; and classifying, the text corpus in accordance with the template.

In a preferred aspect of the present invention, the template may be derived from the second set of reference indicators.

In a further aspect of the present invention, there is provided a method for obtaining, based on the computed relationship, the set of claim features corresponding to the text corpus and the image. The method comprises the steps of generating a set of claims from the set of claim features based on the computed relationship; and/or generating at least one image from the set of claim features based on the computed relationship.

In a further aspect of the present invention, there is also provided a method for obtaining a set of claim features. The method comprises: acquiring at least one input, wherein the input comprises a text corpus and an image; segmenting the text corpus input according to a template, wherein the template is derived from a second set of reference indicators; determining, based on the image input, a first set of reference indicators; computing a relationship between the first set of reference indicators and the text corpus; updating the relationship between the first set of reference indicators and the text corpus based on the second set of reference indicators; and obtaining, based on the computed relationship, the set of claim features corresponding to the text corpus and the image In a further aspect of the present invention, there is also provided a method for updating the relationship between the first set of reference indicators and the text corpus based on the second set of reference indicators. The method comprises: determining a compatibility score between the at least one feature from the first set of reference indicator and the at least one feature from the second set of reference indicators; and computing the relationship between the first set of reference indicators and the second set of reference indicators based on the compatibility score. This reduces the likelihood of overfitting through perturbation using noise from the second set of reference indicators. In the same respect, applying the second set of reference indicator provides better sampling of the claim space.

In a further aspect of the present invention, there is also provided a method for determining a compatibility score between the at least one feature from the first set of reference indicator and the at least one feature from the second set of reference indicators. The method comprises: computing a probability of the at least one feature from the first set of reference indicators given the at least one feature from the second set of reference indicators.

In a further aspect of the present invention, there is also provided a method for determining a compatibility score between the at least one feature from the first set of reference indicator and the at least one feature from the second set of reference indicators. The method comprises the steps of assessing the similarity between the at least one feature from the first set of reference indicator and at least one feature from the second set of reference indicator; and determining the compatibility score based on the assessed similarity.

In a further aspect of the present invention, there is also provided a method for acquiring at least one input, wherein the input may correspond to one or more classification and/or subclassification.

In a further aspect of the present invention, the reference indicator of the first set of reference indicators may correspond to a numeric label of an image object of the image.

In a preferred aspect of the present invention, the image object may correspond to a feature of a patent document.

In another preferred aspect of the present invention, the set of features may have technical character.

In another aspect of the present invention, there is provided a reference indicator, wherein the reference indicator may be of a set of reference indicators. The set of reference indicators may correspond to a pixelated pattern of an image object of the image.

In another preferred aspect of the present invention, the image object may correspond to a feature of the patent document.

In another preferred aspect of the present invention, the feature may be of a technical feature that may correspond to the text corpus.

In a further aspect of the present invention, there is also provided a method for obtaining a set of features, the method comprising: acquiring at least one input, wherein the input comprises a text corpus and an image; determining based on the image input, a first set of reference indicators; segmenting the text corpus input according to a template, wherein the template is derived from a second set of reference indicators; computing a relationship between the first set of reference indicators and the second set of reference indicators; obtaining, based on the computed relationship, the set of features corresponding to the image, text corpus. Preferably, the first and second sets of reference indicators are vectors. This allows for faster convergence using a second set of reference indicators. More specifically, this permits more computational resources being allocated to generating the relationship amongst the claim features as the relationship between the first and second sets of reference indicator is computed.

In a preferred aspect of the present invention, the first and second vectors may be of the same variable size.

In a preferred aspect of the present invention, the first set of reference indicator may comprise at least one numeric label of an image object of the image.

In a preferred aspect of the present invention, the image object corresponds to a feature of the patent document.

In a preferred aspect of the present invention, the feature of the patent document may be of a technical feature.

In a preferred aspect of the present invention, the step of acquiring a set of claim based on the set of features obtained based on the computed relationship, is based on the inputted image and text corpus.

In a preferred aspect of the present invention, the computed relationship embeds the set of technical features. More preferably, the computed relationship infers the semantic relation between the set of technical features.

In a preferred aspect of the present invention, determining, based on the image, the first set of reference indicators further comprises: determining at least one reference indicator of the first set of reference indicators that corresponds to a characteristic and/or a sub-characteristic of the image; and associating the determined at least one reference indicator with at least one feature of a patent document.

Preferably, the sub-characteristic may be of a pixelated object part of an image object of the image stored in a vectorised format.

Another aspect of the present invention where segmenting, the text corpus input according to a template, wherein the template is derived from a second set of reference indicators further comprises: determining at least one reference indicator of the second set of reference indicators that correspond to at least one feature of the patent document; deriving the template based on the at least one reference indicator of the second set of reference indicators; and classifying, the text corpus in accordance with the template. Preferably, the template may be a data structure.

More preferably, the template may be derived from a feed-forward network.

Even more preferably, the feed-forward network may be temporally dependent.

Another aspect of the present invention where the patent document comprises a published patent application, a granted patent, or a technical document.

Preferably, granted patent is at least an expired patent document.

More preferably, granted patent is a patent that is within its statutory term with respect to the jurisdiction of which the patent is filed.

Another aspect of the present invention where the patent document comprises only granted patent. More preferably, the granted patent is under litigation or been litigated at jurisdiction that the patent has been granted.

Another aspect of the present invention where the statutory term is a normal statutory term or an extended normal statutory term.

Preferably, normal statutory term is set forth by the statutory guidelines of the patent term per jurisdiction of which the patent has been filed.

Another aspect of the present invention where the text corpus further comprises: at least one technical feature; at least one non-technical feature; and at least one statement relating to the at least one technical feature.

Another aspect of the present invention where the computing a relationship between the first set of reference indicators and the second set of reference indicators further comprises: determining a compatibility score between the at least one feature from the first set of reference indicator and the at least one feature from the second set of reference indicators; and computing the relationship between the first set of reference indicators and the second set of reference indicators based on the compatibility score.

Another aspect of the present invention the first set of reference indicators and the second set of reference indicators are derived from a common vector or set of common vectors corresponding to the image and text corpus.

Preferably, the group of vectors may be fed into a feed-forward network.

More preferably, the feed-forward network may be temporally dependent.

Another aspect of the present invention where the determining a compatibility score between the at least one feature from the first set of reference indicator and the at least one feature from the second set of reference indicators further comprises: computing a probability of the at least one feature from the first set of reference indicators, given the at least one feature from the second set of reference indicators.

Another aspect of the present invention the first set of reference indicators and the second set of reference indicators may be derived from one another.

Preferably, where the determining a compatibility score between the at least one feature from the first set of reference indicator and the at least one feature from the second set of reference indicators further comprises: computing a likelihood between the at least one feature from the first set of reference indicators and the features of the second set of reference indicators.

More preferably, likelihood may be approximated and/or derived using the expectation of the likelihood.

Another aspect of the present invention the first set of reference indicators and the second set of reference indicators are dependent, where the first set of reference indicators and the second set of reference indicators are the same or conjoining set of reference indicators. Then, a compatibility score between the at least one feature from the first set of reference indicator and the at least one feature from the second set of reference indicators is indicative of equivalence or equal to one.

Preferably, computing a probability between the at least one feature from the first set of reference indicators and the entire first set of reference indicators.

More preferably, computing the probability of the at least one feature given the first set of reference indicators.

Even more preferably, computing the probability may be of an approximation and/or derived using its expectation.

Another aspect of the present invention where the determining a compatibility score between the at least one feature from the first set of reference indicator and the at least one feature from the second set of reference indicators further comprises: assessing similarity between the at least one feature from the first set of reference indicator and at least one feature from the second set of reference indicator; and determining the compatibility score based on the assessed similarity.

Another aspect of the present invention where the first and second reference indicators are independent of each other. Then, segmenting, the text corpus input according to a template, wherein the template is derived from a second set of reference indicator further comprises: extracting a first vector, wherein the first vector represents a semantic association between at least one feature of the text corpus; extracting a second vector, wherein the second vector represents a transitive relationship between the at least features of the text corpus; compiling a matrix using the extracted first and second vectors and creating the template based on the extracted matrix.

Preferably, the extracted matrix is a tensor. More preferably, the extracted matrix may be derived from a feed-forward network.

Detailed formulation to enable implementations of any above-mentioned neural networks or aspects of the present invention can be found in the reference cited below. The formulation are not limited to these citations but only serving as a starting point or example for the purpose of merely to enable the present invention. The formulation includes any mathematical formulation or exemplary code for implementing the neural network model. The codes may be associated with but not limited to such machine learning packages as Tensorflow, Pytorch, Apache MXNet, Theano, Caffe, and Fast.ai, using languages such as Python, Java, R, C++, C, JavaScript, Scala, and Julia.

It will be appreciated that the present invention is not limited to the exact examples described above and illustrated in the accompanying drawings, and that various modifications and changes can be made without departing from the scope thereof. It is intended that the scope of the invention only be limited by the appended claims

What is claimed is:

1. A system comprising one or more computers and one or more storage devices storing instructions that when executed by the one or more computers cause the one or more computers to perform steps based on a plurality of networks for processing at least one input, wherein the plurality of networks comprising:
    at least one first network for encoding input from a text corpus,
    at least one second network for encoding input from an image,
    a third network having an input layer for receiving input from the first and second network and an output layer for generating a claim set corresponding to the text corpus and the image; and
    wherein said steps performed by the one or more computers comprising:
        acquiring, said at least one input, wherein said at least one input is the image corresponding to a class of patent documents,
        encoding the image input via the plurality of networks,
        generating a set of vectors via the plurality of networks, wherein the set of vectors corresponds to a partial representation of the image derived from the plurality of networks,
        decoding the set of vectors via the plurality of networks based on the text corpus encoded by the plurality of networks that corresponds to the class of patent documents, and
        obtaining the claim set via the plurality of networks corresponding to the image; and
    wherein the plurality of networks is trained by:
        initializing said at least one first, second, or third network of the plurality of networks with weights of a generated value and an adaptive learning rate to an initial value,
        storing an input layer pattern of images and an output layer pattern of claims,
        processing the input layer pattern of images in the plurality of networks to obtain an output pattern of claims,
        calculating an error between the output layer pattern of images and the output pattern of claims, and
        updating the adaptive learning rate with respect to the calculated error until a final trained state is achieved, otherwise, repeating steps above for as many iterations as necessary to reach the final trained state.

2. The system of claim 1, wherein the at least one input further comprises a text input that is encoded via the at least one first network and used to generate the set of vectors via the at least one first network.

3. The system of claim 1, wherein the system is configured to receive a second input comprising: at least one feature; and at least one statement relating to the at least one feature.

4. The system of claim 3, wherein the text input is selectively added to the predetermined text corpus so that the predetermined text corpus is updated based on the class of patent documents.

5. The system of claim 4, wherein the patent document comprises a published patent application, a granted patent, or a technical document.

6. The system of claim 5, wherein the granted patent is at least an unexpired patent.

7. The system of claim 1, wherein the image comprises at least one non-color image.

8. The system of claim 1, wherein the at least one first network is a convolutional neural network (CNN).

9. The system of claim 1, wherein the at least one second network is a recurrent neural network (RNN) comprises a Long-Short Term Memory network (LSTM).

10. The system of claim 1, wherein the obtaining the claim set via said plurality of networks corresponding to the image, further comprising: generating a patent description from the claim set via the third network; or generating at least one image from the claim set of claimed features via at least one fourth network.

11. The system of claim 1, wherein the plurality of networks further comprising: at least one fourth network configured to receive input from the third network, wherein the third network is configured to receive input only from the first network, wherein the at least one fourth network is configured to receive input from the first network for generating an updated claim set corresponding to the text corpus and the image.

12. A method comprising:
acquiring, at least one input, wherein the input is an image corresponding to a class of patent documents;
encoding the image input via a plurality of networks;
generating a set of vectors via the plurality of networks, wherein the set of vectors corresponds to a partial representation of the image derived from the plurality of networks;
decoding the set of vectors, based on a predetermined text corpus that corresponds to the class of patent documents, via the plurality of networks;
obtaining a claim set via the plurality of networks corresponding to the image; and
wherein the plurality of networks is trained by:
initializing at least one network of the plurality of networks with weights of a generated value and an adaptive learning rate to an initial value,
storing an input layer pattern of images and an output layer pattern of claims, wherein input layer pattern of images is at least one reference indicator associated with the image and the output layer pattern of claims is the at least one reference indicator associated with the claim set,
processing the input layer pattern of images in the network to obtain an output pattern of claims,
calculating an error between the output layer pattern of images and the output pattern of claims, and
updating the adaptive learning rate with respect to the calculated error until a final trained state is achieved, otherwise, repeating steps above for as many iterations as necessary to reach the final trained state.

13. A non-transitory machine-readable medium comprising instructions that, when executed by a machine, cause the machine to perform operations comprising:
acquiring, at least one input, wherein the input is an image corresponding to a class of patent documents;
encoding the image input via a plurality of networks, wherein the plurality of networks comprising:
at least one first network for encoding input from a text corpus,
at least one second network for encoding input from the image,
a third network having an input layer for receiving input from the first and second network and an output layer for generating a claim set corresponding to the text corpus and the image;
generating a set of vectors via the plurality of networks, wherein the set of vectors corresponds to a partial representation of the image derived from the plurality of networks;
decoding the set of vectors via the plurality of networks based the text corpus that corresponds to the class of patent documents;
obtaining a claim set via the plurality of networks corresponding to the image,
wherein the plurality of networks is trained by:
initializing said at least one first, second, or third network of the plurality of networks with weights of a generated value and an adaptive learning rate to an initial value,
storing an input layer pattern of images and an output layer pattern of claims,
processing the input layer pattern of images in the network to obtain an output pattern of claims,
calculating an error between the output layer pattern of images and the output pattern of claims, and
updating the adaptive learning rate with respect to the calculated error until a final trained state is achieved, otherwise, repeating steps above for as many iterations as necessary to reach the final trained state.

\* \* \* \* \*